us010091335B2

(12) United States Patent
Paila et al.

(10) Patent No.: US 10,091,335 B2
(45) Date of Patent: *Oct. 2, 2018

(54) DATA TRANSMISSION AND RENDERING TECHNIQUES BY A DEVICE VIA A NETWORK

(71) Applicant: June Ray Limited, Road Town (VG)

(72) Inventors: Narasimha Rao Paila, Santa Clara, CA (US); Ajit Ramachandra Mayya, Saratoga, CA (US); Huy Nguyen, Cupertino, CA (US); Shannon Norrell, San Mateo, CA (US)

(73) Assignee: June Ray Limited (VG)

( * ) Notice: Subject to any disclaimer, the term of this patent is extended or adjusted under 35 U.S.C. 154(b) by 148 days.

This patent is subject to a terminal disclaimer.

(21) Appl. No.: 15/203,701

(22) Filed: Jul. 6, 2016

(65) Prior Publication Data
US 2017/0006138 A1 Jan. 5, 2017

Related U.S. Application Data

(63) Continuation of application No. 14/083,567, filed on Nov. 19, 2013, now Pat. No. 9,413,808, which is a
(Continued)

(51) Int. Cl.
*G06F 17/22* (2006.01)
*H04L 29/06* (2006.01)
(Continued)

(52) U.S. Cl.
CPC .......... *H04L 67/42* (2013.01); *G06F 9/45512* (2013.01); *G06F 17/2247* (2013.01);
(Continued)

(58) Field of Classification Search
CPC ............... G06Q 30/0609; G06Q 30/0611; H04L 67/34; H04L 67/42; H04L 67/02; G06F 17/2247; G06F 9/45512
See application file for complete search history.

(56) References Cited

U.S. PATENT DOCUMENTS 2,781,643 A 2/1957 Fairweather
3,406,532 A 10/1968 Rownd
(Continued)

FOREIGN PATENT DOCUMENTS

EP 0425405 A2 5/1991
FR 2696722 4/1994
(Continued)

OTHER PUBLICATIONS

Ives, Blake et al., 'The Information System as a Competitive Weapon', Communications of the ACM, vol. 27, No. 12, Dec. 1984. 9 pages.
(Continued)

*Primary Examiner* — Maikhanh Nguyen
(74) *Attorney, Agent, or Firm* — Van Pelt, Yi & James LLP

(57) ABSTRACT

A technique is disclosed for generating formatted information for display on a computing device. The computing device may be configured to include at least one interface for communicating with a server computing device. A request is sent from the computing device to the server system. According to one embodiment, the request may correspond to an HTTP request for information relating to a specific HTML page or web page. A response is then received from the server system. According to one embodiment, the response includes response information comprising embedded instructions and data. The embedded instructions may include instructions for using the data to generate formatted markup information for display on the computing device. The embedded instructions are then executed on the data to thereby generate formatted markup information for display on the computing device. According to a specific embodiment, the formatted markup information corresponds to
(Continued)

HTML data to be rendered for display on the computing device.

20 Claims, 6 Drawing Sheets

Related U.S. Application Data continuation of application No. 12/925,669, filed on Oct. 27, 2010, now Pat. No. 8,601,365, which is a continuation of application No. 12/378,643, filed on Feb. 17, 2009, now Pat. No. 7,853,870, which is a continuation of application No. 11/821,307, filed on Jun. 22, 2007, now Pat. No. 7,493,554, which is a continuation of application No. 09/792,400, filed on Feb. 22, 2001, now Pat. No. 7,240,283.

(60) Provisional application No. 60/247,392, filed on Nov. 10, 2000.

(51) Int. Cl.
    *G06F 9/455*     (2018.01)
    *G06Q 30/06*     (2012.01)
    *H04L 29/08*     (2006.01)

(52) U.S. Cl.
    CPC ..... *G06Q 30/0609* (2013.01); *G06Q 30/0611* (2013.01); *H04L 67/02* (2013.01); *H04L 67/34* (2013.01)

(56) References Cited

U.S. PATENT DOCUMENTS

| | | |
|---|---|---|
| 3,670,867 A | 6/1972 | Traube |
| 3,771,679 A | 11/1973 | Thelm |
| 4,090,626 A | 5/1978 | Ebeling |
| 4,213,310 A | 7/1980 | Buss |
| 4,455,453 A | 6/1984 | Parasekvakos |
| 4,530,067 A | 7/1985 | Dorr |
| 4,656,591 A | 4/1987 | Goldberg |
| 4,792,273 A | 12/1988 | Specht |
| 4,799,156 A | 1/1989 | Shavit |
| 4,803,348 A | 2/1989 | Lohrey |
| 4,823,984 A | 4/1989 | Ficken |
| 4,887,208 A | 12/1989 | Schneider |
| 4,936,738 A | 6/1990 | Brennan |
| 4,958,280 A | 9/1990 | Pauly |
| 5,003,015 A | 3/1991 | Fleischmann |
| 5,023,683 A | 6/1991 | Yamada |
| 5,027,269 A | 6/1991 | Grant |
| 5,038,283 A | 8/1991 | Caveney |
| 5,093,794 A | 3/1992 | Howie |
| 5,101,352 A | 3/1992 | Rembert |
| 5,105,627 A | 4/1992 | Kurita |
| 5,113,349 A | 5/1992 | Nakamura |
| 5,122,959 A | 6/1992 | Nathanson |
| 5,235,819 A | 8/1993 | Bruce |
| 5,237,158 A | 8/1993 | Kern |
| 5,246,332 A | 9/1993 | Bernard |
| 5,265,006 A | 11/1993 | Asthana |
| 5,272,638 A | 12/1993 | Martin |
| 5,273,392 A | 12/1993 | Bernard |
| 5,322,406 A | 6/1994 | Pippin |
| 5,334,824 A | 8/1994 | Martinez |
| 5,362,948 A | 11/1994 | Morimoto |
| 5,363,310 A | 11/1994 | Haj-Ali Ahmadi |
| 5,371,852 A | 12/1994 | Attanasio |
| 5,395,206 A | 3/1995 | Cerny |
| 5,402,336 A | 3/1995 | Spiegelhoff |
| 5,428,546 A | 6/1995 | Shah |
| 5,434,394 A | 7/1995 | Roach |
| 5,444,844 A | 8/1995 | Inoue |
| 5,450,317 A | 9/1995 | Lu |
| 5,479,530 A | 12/1995 | Nair |
| 5,533,361 A | 7/1996 | Halpern |
| 5,535,407 A | 7/1996 | Yanagawa |
| 5,548,518 A | 8/1996 | Dietrich |
| 5,553,312 A | 9/1996 | Gattey |
| 5,568,393 A | 10/1996 | Ando |
| 5,592,378 A | 1/1997 | Cameron |
| 5,593,269 A | 1/1997 | Bernard |
| 5,598,487 A | 1/1997 | Hacker |
| 5,615,121 A | 3/1997 | Babayev |
| 5,640,002 A | 6/1997 | Ruppert |
| 5,664,110 A | 9/1997 | Green |
| 5,666,493 A | 9/1997 | Wojcik |
| 5,687,322 A | 11/1997 | Deaton |
| 5,694,551 A | 12/1997 | Doyle |
| 5,708,780 A | 1/1998 | Levergood |
| 5,710,887 A | 1/1998 | Chelliah |
| 5,712,989 A | 1/1998 | Johnson |
| 5,715,314 A | 2/1998 | Payne |
| 5,758,313 A | 5/1998 | Shah |
| 5,758,328 A | 5/1998 | Giovannoli |
| 5,758,329 A | 5/1998 | Wojcik |
| 5,761,673 A | 6/1998 | Bookman |
| 5,768,139 A | 6/1998 | Pippin |
| 5,774,660 A | 6/1998 | Brendel |
| 5,774,668 A | 6/1998 | Choquier |
| 5,774,670 A | 6/1998 | Montulli |
| H001743 H | 8/1998 | Graves |
| 5,790,793 A * | 8/1998 | Higley ................. G06Q 10/107 707/E17.112 |
| 5,809,479 A | 9/1998 | Martin |
| 5,816,725 A | 10/1998 | Sherman |
| 5,826,242 A * | 10/1998 | Montulli ........... G06F 17/30899 705/26.8 |
| 5,826,825 A | 10/1998 | Gabriet |
| 5,831,860 A | 11/1998 | Foladare |
| 5,832,457 A | 11/1998 | Cherney |
| 5,834,753 A | 11/1998 | Danielson |
| 5,835,914 A | 11/1998 | Brim |
| 5,839,117 A | 11/1998 | Cameron |
| 5,848,395 A | 12/1998 | Edgar |
| 5,870,473 A | 2/1999 | Boesch |
| 5,878,401 A | 3/1999 | Joseph |
| 5,880,443 A | 3/1999 | McDonald |
| 5,884,216 A | 3/1999 | Shah |
| 5,893,076 A | 4/1999 | Hafner |
| 5,894,554 A | 4/1999 | Lowery |
| 5,895,454 A | 4/1999 | Harrington |
| 5,897,622 A | 4/1999 | Blinn |
| 5,897,629 A | 4/1999 | Shinagawa |
| 5,899,088 A | 5/1999 | Purdum |
| 5,910,896 A | 6/1999 | Hahn-Carlson |
| 5,918,213 A | 6/1999 | Bernard |
| 5,922,040 A | 7/1999 | Prabhakaran |
| 5,943,652 A | 8/1999 | Sisley |
| 5,943,841 A | 8/1999 | Wunscher |
| 5,949,776 A | 9/1999 | Mahany |
| 5,950,173 A | 9/1999 | Perkowski |
| 5,956,709 A | 9/1999 | Xue |
| 5,960,411 A | 9/1999 | Hartman |
| 5,961,601 A | 10/1999 | Iyengar |
| 5,963,919 A | 10/1999 | Brinkley |
| 5,974,401 A | 10/1999 | Enomoto |
| 5,979,757 A | 11/1999 | Tracy |
| 5,983,200 A | 11/1999 | Slotznick |
| 5,987,377 A | 11/1999 | Westerlage |
| 5,991,739 A | 11/1999 | Cupps |
| 5,999,914 A | 12/1999 | Blinn |
| 6,003,015 A | 12/1999 | Kang |
| 6,006,100 A | 12/1999 | Koenck |
| 6,016,504 A | 1/2000 | Arnold |
| 6,021,392 A | 2/2000 | Lester |
| 6,023,683 A | 2/2000 | Johnson |
| 6,023,722 A | 2/2000 | Colyer |
| 6,026,378 A | 2/2000 | Onozaki |
| 6,058,417 A | 5/2000 | Hess |
| 6,061,607 A | 5/2000 | Bradley |
| 6,070,147 A | 5/2000 | Harms |
| 6,073,108 A | 6/2000 | Peterson |

(56) References Cited

U.S. PATENT DOCUMENTS

| | | | |
|---|---|---|---|
| 6,076,106 A | 6/2000 | Hamner |
| 6,076,108 A | 6/2000 | Courts |
| 6,081,789 A | 6/2000 | Purcell |
| 6,083,279 A | 7/2000 | Cuomo |
| 6,084,528 A | 7/2000 | Beach |
| 6,085,170 A | 7/2000 | Tsukuda |
| 6,087,952 A | 7/2000 | Prabhakaran |
| 6,088,648 A | 7/2000 | Shah |
| 6,094,485 A | 7/2000 | Weinstein |
| 6,094,642 A | 7/2000 | Stephenson |
| 6,098,093 A | 8/2000 | Baych |
| 6,098,152 A | 8/2000 | Mounes-Toussi |
| 6,101,481 A | 8/2000 | Miller |
| 6,101,486 A | 8/2000 | Roberts |
| 6,115,690 A | 9/2000 | Wong |
| 6,123,259 A | 9/2000 | Ogasawara |
| 6,128,279 A | 10/2000 | ONeil |
| 6,140,922 A | 10/2000 | Kakou |
| 6,144,848 A | 11/2000 | Walsh |
| 6,157,380 A | 12/2000 | Bennett |
| 6,157,945 A | 12/2000 | Balma |
| 6,158,601 A | 12/2000 | Baker |
| 6,167,380 A | 12/2000 | Kennedy |
| 6,167,382 A | 12/2000 | Sparks |
| 6,178,510 B1 | 1/2001 | OConnor |
| 6,182,053 B1 | 1/2001 | Rauber |
| 6,185,479 B1 | 2/2001 | Cirrone |
| 6,185,601 B1 | 2/2001 | Wolff |
| 6,185,625 B1 | 2/2001 | Tso |
| 6,195,542 B1 * | 2/2001 | Griffith ................ G06Q 20/04 455/406 |
| 6,208,908 B1 | 3/2001 | Boyd |
| 6,215,952 B1 | 4/2001 | Yoshio |
| 6,223,215 B1 | 4/2001 | Hunt |
| 6,225,995 B1 | 5/2001 | Jacobs |
| 6,233,543 B1 | 5/2001 | Butts |
| 6,236,972 B1 | 5/2001 | Shkedy |
| 6,236,974 B1 | 5/2001 | Kolawa |
| 6,237,040 B1 * | 5/2001 | Tada ................ G06F 17/30899 707/E17.119 |
| 6,249,773 B1 | 6/2001 | Allard |
| 6,249,801 B1 | 6/2001 | Zisapel |
| 6,253,292 B1 | 6/2001 | Jhang |
| 6,260,024 B1 | 7/2001 | Shkedy |
| 6,275,812 B1 | 8/2001 | Haq |
| 6,279,001 B1 | 8/2001 | DeBettencourt |
| 6,289,260 B1 | 9/2001 | Bradley |
| 6,289,369 B1 | 9/2001 | Sundaresan |
| 6,289,370 B1 | 9/2001 | Panarello |
| 6,292,784 B1 | 9/2001 | Martin |
| 6,295,553 B1 | 9/2001 | Gilbertson |
| 6,317,648 B1 | 11/2001 | Sleep |
| 6,324,520 B1 | 11/2001 | Walker |
| 6,332,334 B1 | 12/2001 | Faryabi |
| 6,341,269 B1 | 1/2002 | Dulaney |
| 6,343,275 B1 | 1/2002 | Wong |
| 6,347,322 B1 | 2/2002 | Bogantz |
| 6,351,775 B1 | 2/2002 | Yu |
| 6,360,256 B1 | 3/2002 | Lim |
| 6,369,840 B1 | 4/2002 | Barnett |
| 6,374,300 B2 | 4/2002 | Masters |
| 6,385,642 B1 | 5/2002 | Chlan |
| 6,397,246 B1 | 5/2002 | Wolfe |
| 6,405,173 B1 | 6/2002 | Honarvar |
| 6,421,106 B1 | 7/2002 | Takatsuka |
| 6,421,739 B1 | 7/2002 | Holiday |
| 6,424,947 B1 | 7/2002 | Tsuria |
| 6,424,992 B2 | 7/2002 | Devarakonda |
| 6,429,801 B1 | 8/2002 | Pergande |
| 6,438,652 B1 | 8/2002 | Jordan |
| 6,445,976 B1 | 9/2002 | Ostro |
| 6,453,306 B1 | 9/2002 | Quelene |
| 6,463,345 B1 | 10/2002 | Peachey-Kountz |
| 6,463,420 B1 | 10/2002 | Guidice |
| 6,466,949 B2 | 10/2002 | Yang |
| 6,471,995 B1 | 10/2002 | Ramstack |
| 6,473,802 B2 | 10/2002 | Masters |
| 6,480,894 B1 | 11/2002 | Courts |
| 6,484,150 B1 | 11/2002 | Blinn |
| 6,490,567 B1 | 12/2002 | Gregory |
| 6,496,205 B1 | 12/2002 | White |
| 6,505,093 B1 | 1/2003 | Thatcher |
| 6,505,171 B1 | 1/2003 | Cohen |
| 6,526,392 B1 | 2/2003 | Dietrich |
| 6,530,518 B1 | 3/2003 | Krichilsky |
| 6,535,726 B1 * | 3/2003 | Johnson ................ G06Q 20/04 235/381 |
| 6,535,880 B1 | 3/2003 | Muskgrove |
| 6,539,494 B1 | 3/2003 | Abramson |
| 6,549,891 B1 | 4/2003 | Rauber |
| 6,560,717 B1 | 5/2003 | Scott |
| 6,567,786 B1 | 5/2003 | Bibelnieks |
| 6,567,848 B1 | 5/2003 | Kusuda |
| 6,571,213 B1 | 5/2003 | Altendahl |
| 6,578,005 B1 | 6/2003 | Lesaint |
| 6,587,827 B1 | 7/2003 | Hennig |
| 6,587,866 B1 | 7/2003 | Modi |
| 6,594,641 B1 | 7/2003 | Southam |
| 6,594,692 B1 | 7/2003 | Reisman |
| 6,598,024 B1 | 7/2003 | Walker |
| 6,598,027 B1 | 7/2003 | Breen |
| 6,601,101 B1 | 7/2003 | Lee |
| 6,609,159 B1 | 8/2003 | Dukach |
| 6,622,127 B1 | 9/2003 | Klots |
| 6,629,079 B1 | 9/2003 | Spiegel |
| 6,629,135 B1 | 9/2003 | Ross |
| 6,654,726 B1 | 11/2003 | Hanzek |
| 6,671,818 B1 | 12/2003 | Mikurak |
| 6,679,425 B1 | 1/2004 | Sheppard |
| 6,691,165 B1 | 2/2004 | Bruck |
| 6,697,849 B1 | 2/2004 | Carlson |
| 6,697,964 B1 | 2/2004 | Dodrill |
| 6,701,367 B1 | 3/2004 | Belkin |
| 6,711,618 B1 | 3/2004 | Danner |
| 6,718,387 B1 | 4/2004 | Gupta |
| 6,721,713 B1 | 4/2004 | Guheen |
| 6,741,995 B1 | 5/2004 | Chen |
| 6,748,318 B1 | 6/2004 | Jones |
| 6,748,418 B1 | 6/2004 | Yoshida |
| 6,763,496 B1 | 7/2004 | Hennings |
| 6,772,333 B1 | 8/2004 | Brendel |
| 6,779,016 B1 | 8/2004 | Aziz |
| 6,788,425 B1 | 9/2004 | Ohtsuka |
| 6,799,165 B1 | 9/2004 | Boesjes |
| 6,801,949 B1 | 10/2004 | Bruck |
| 6,826,613 B1 | 11/2004 | Wang |
| 6,845,503 B1 | 1/2005 | Carlson |
| 6,859,834 B1 | 2/2005 | Arora |
| 6,862,572 B1 | 3/2005 | de Sylva |
| 6,865,601 B1 | 3/2005 | Cherkasova |
| 6,873,970 B2 | 3/2005 | Showghi |
| 6,879,965 B2 | 4/2005 | Fung |
| 6,879,995 B1 | 4/2005 | Chinta |
| 6,888,836 B1 | 5/2005 | Cherkasova |
| 6,901,382 B1 | 5/2005 | Richards |
| 6,904,455 B1 | 6/2005 | Yen |
| 6,938,079 B1 | 8/2005 | Anderson |
| 6,947,992 B1 | 9/2005 | Shachor |
| 6,957,186 B1 | 10/2005 | Guheen |
| 6,963,847 B1 | 11/2005 | Kennedy |
| 6,970,837 B1 | 11/2005 | Walker |
| 6,975,937 B1 | 12/2005 | Kantarjiev |
| 6,980,962 B1 | 12/2005 | Reisman |
| 6,990,460 B2 | 1/2006 | Parkinson |
| 7,010,501 B1 | 3/2006 | Roslak |
| 7,028,187 B1 | 4/2006 | Rosen |
| 7,035,914 B1 | 4/2006 | Payne |
| 7,040,541 B2 | 5/2006 | Swartz |
| 7,043,455 B1 | 5/2006 | Cuomo |
| 7,062,556 B1 | 6/2006 | Chen |
| 7,085,729 B1 | 8/2006 | Kennedy |
| 7,124,101 B1 | 10/2006 | Mikurak |
| 7,139,637 B1 | 11/2006 | Waddington |
| 7,139,721 B2 | 11/2006 | Borders |

(56) References Cited

U.S. PATENT DOCUMENTS

| | | | |
|---|---|---|---|
| 7,151,612 B2 | 12/2006 | Mikami |
| 7,165,041 B1 | 1/2007 | Guheen |
| 7,173,177 B1 | 2/2007 | Gould |
| 7,177,825 B1 | 2/2007 | Borders |
| 7,181,539 B1 | 2/2007 | Knight |
| 7,197,547 B1 | 3/2007 | Miller |
| 7,222,161 B2 | 5/2007 | Yen |
| 7,236,942 B1 | 6/2007 | Walker |
| 7,240,283 B1 | 7/2007 | Narashimha |
| 7,251,612 B1 | 7/2007 | Parker |
| 7,275,042 B1 | 9/2007 | Kelly |
| 7,299,294 B1 | 11/2007 | Bruck |
| 7,346,564 B1 | 3/2008 | Kirklin |
| 7,366,755 B1 | 4/2008 | Cuomo |
| 7,370,005 B1 | 5/2008 | Ham |
| 7,383,233 B1 | 6/2008 | Singh |
| 7,437,305 B1 | 10/2008 | Kantarjiev |
| 7,493,554 B2 | 2/2009 | Paila |
| 7,509,407 B2 | 3/2009 | Miller |
| 7,532,947 B2 | 5/2009 | Waddington |
| 7,603,302 B1 | 10/2009 | Drummond |
| 7,792,712 B2 | 9/2010 | Kantarjiev |
| 7,853,870 B2 | 12/2010 | Paila |
| 7,882,501 B1 | 2/2011 | Carlson |
| 7,904,975 B2 | 3/2011 | Kruglikov |
| 7,930,416 B2 | 4/2011 | Miller |
| 8,010,411 B2 | 8/2011 | Woodward |
| 8,140,183 B2 | 3/2012 | Waddington |
| 8,170,915 B2 | 5/2012 | Borders |
| 8,326,708 B2 | 12/2012 | Kantarjiev |
| 8,600,821 B2 | 12/2013 | Borders |
| 8,601,365 B2 | 12/2013 | Paila |
| 8,626,333 B2 | 1/2014 | Waddington |
| 8,635,113 B2 | 1/2014 | Borders |
| 8,751,334 B2 | 6/2014 | Wijaya |
| 2001/0013007 A1 | 8/2001 | Tsukuda |
| 2001/0016828 A1 | 8/2001 | Philippe |
| 2001/0037229 A1 | 11/2001 | Jacobs |
| 2001/0042021 A1 | 11/2001 | Matsuo |
| 2001/0042050 A1 | 11/2001 | Fletcher |
| 2001/0047285 A1 | 11/2001 | Borders |
| 2001/0047310 A1 | 11/2001 | Russell |
| 2001/0049619 A1 | 12/2001 | Powell |
| 2001/0049672 A1 | 12/2001 | Moore |
| 2001/0052024 A1 | 12/2001 | Devarakonda |
| 2002/0002513 A1 | 1/2002 | Chiasson |
| 2002/0004766 A1 | 1/2002 | White |
| 2002/0007299 A1 | 1/2002 | Florence |
| 2002/0010633 A1 | 1/2002 | Brotherson |
| 2002/0013950 A1 | 1/2002 | Tomsen |
| 2002/0038224 A1 | 3/2002 | Bhadra |
| 2002/0038261 A1 | 3/2002 | Kargman |
| 2002/0049853 A1 | 4/2002 | Chu |
| 2002/0050526 A1 | 5/2002 | Swartz |
| 2002/0065700 A1 | 5/2002 | Powell |
| 2002/0116279 A1 | 8/2002 | Nobilio |
| 2002/0188530 A1 | 12/2002 | Wojcik |
| 2002/0194084 A1 | 12/2002 | Surles |
| 2002/0194087 A1 | 12/2002 | Spiegel |
| 2003/0065565 A1 | 4/2003 | Wagner |
| 2003/0079227 A1 | 4/2003 | Knowles |
| 2003/0119485 A1 | 6/2003 | Ogasawara |
| 2003/0233190 A1 | 12/2003 | Jones |
| 2004/0107125 A1 | 6/2004 | Guheen |
| 2004/0236635 A1 | 11/2004 | Publicover |
| 2005/0027580 A1 | 2/2005 | Crici |
| 2005/0144641 A1 | 6/2005 | Lewis |
| 2005/0261985 A1 | 11/2005 | Miller |
| 2006/0085250 A1 | 4/2006 | Kantarjiev |
| 2006/0142895 A1 | 6/2006 | Waddington |
| 2007/0016463 A1 | 1/2007 | Borders |
| 2007/0112647 A1 | 5/2007 | Borders |
| 2007/0162353 A1 | 7/2007 | Borders |
| 2007/0174144 A1 | 7/2007 | Borders |
| 2007/0250572 A1 | 10/2007 | Narashimha |
| 2008/0015959 A1 | 1/2008 | Kruglikov |
| 2008/0154709 A1 | 6/2008 | Ham |
| 2009/0063439 A1 | 3/2009 | Rauser |
| 2009/0094085 A1 | 4/2009 | Kantarjiev |
| 2009/0150534 A1 | 6/2009 | Miller |
| 2009/0164570 A1 | 6/2009 | Paila |
| 2009/0222129 A1 | 9/2009 | Waddington |
| 2010/0241269 A1 | 9/2010 | Ham |
| 2010/0332402 A1 | 12/2010 | Kantarjiev |
| 2011/0047210 A1 | 2/2011 | Paila |
| 2011/0173090 A1 | 7/2011 | Miller |
| 2011/0258074 A1 | 10/2011 | Woodward |
| 2012/0173449 A1 | 7/2012 | Waddington |
| 2014/0074919 A1 | 3/2014 | Paila |
| 2014/0089138 A1 | 3/2014 | Borders |
| 2014/0108287 A1 | 4/2014 | Waddington |
| 2014/0229338 A1 | 8/2014 | Borders |

FOREIGN PATENT DOCUMENTS

| | | |
|---|---|---|
| GB | 2265032 A | 9/1993 |
| WO | 9907121 | 2/1992 |
| WO | 9909508 | 2/1999 |

OTHER PUBLICATIONS

Jaffe, Charles A. 'Gas supplier takes timing seriously if deliveries are late, the product is free,' The Morning Call, Allentown, PA, Feb. 5, 1989, pp. 1-4.

Koster, Rene de, 'Routing Orderpickers in a Warehouse: A Comparison Between Optimal and Heuristic Solutions,' IIE Transactions, May 1998, vol. 30, No. 5, p. 469.

Load-Balancing Internet Servers, IBM International Technical Support Organization, Austin Center, Dec. 1997, International Business Machines Corporation 1997, pp. 1-162.

Maeglin, Kathy, 'Services Take the 'Shop' Out of Shopping for Groceries', The Capital Times, Mar. 20, 1997, 2 pages.

Mai et al., 'Consumers' Perceptions of Specialty Foods and the Rural Mail Order Business', 52nd EAAE Seminar—Parma, Jun. 19-21, 1997, pp. 331-348.

Malone et al., 'Computers, Networks, and the Corporation,' Center for Information Systems Research, MIT, Aug. 1991, 14 pages.

Maloney, David, 'The New Corner Drugstore', Modern Materials Handling, vol. 55, No. 5, May 1, 2000, p. 58.

Marsh, Barbara, 'Peapod's On-Line Grocery Service Checks Out Success—Customers Shop Electronic Aisles; Finicky Workers Sack the Goods', The Wall Street Journal, Jun. 30, 1994, 2 pages.

Meeker et al., The Internet Retailing Report, U.S. Investment Research, Morgan Stanley, May 28, 1997, 241 pages.

Menzies, David, 'Checking out the aisles by computer: Cori Bonina, General Manager of Stong's market in Vancouver, has made a virtual success of a meat-and-potatoes business', National Post, Dec. 1, 1998, 2 pages.

New medium, new message, Oct. 23, 1993, The Economist, vol. 329, Iss. 7834, p. S16, 3 pgs.

Norton, Dr. Tim, "End-To-End Response Time: Where to Measure?", Simalytic Solutions, LLC CMG99 Session 423, Dec. 8, 1999.

Numetrix Unveils xtr@; an Internet-Designed Solution for Real-Time Supply Chain Collaboration, Business/Technology Editors, Business Wire, New York: Dec. 16, 1998, http://proquest.umi.com/pqdweb?index=11&did=37215461&SrchMode=2&sid=1&Fmt=3 . . . Jan. 16, 2010, pp. 1-4.

Parker, Rachel, 'UPS Pioneers a cellular data network', InfoWorld, ABI/INFORM Global, Jun. 8, 1992, pp. S59-S60.

Patterson, Rebecca H., 'No Lines at Britain's First On-Line Grocery Store, but You Still May Wait', The Wall Street Journal Europe, Jul. 25, 1997, 3 pages.

PC Foods, 'Customer Service Agreement,' printed from website: http://pcfoods.com, Abstract No. XP-002245026, 1999, pp. 1-2.

Peapod, Inc., Telephone Grocery Shopping Guide, Aug. 7, 1992, 3 introductory pages and pp. 1-12.

Pearce, Michael R. 'From carts to clicks', Ivey Business Quarterly, Autumn 1998, vol. 63, No. 1, p. 69-71.

(56) References Cited

OTHER PUBLICATIONS

Podmolik, Mary Ellen, 'Groceries Seeing Green From Computer Shopping', Chicago Sun-Times, May 8, 1996, 1 page.
Poirier, Charles et al., Supply Chain Optimization, Building the Strongest Total Business Network, Berrett-Koehler Publishers, San Francisco, Copyright 1996, 30 pages.
Purpura, Linda, 'Getting to House from Order Smooth Transitions from Order, to Pick, to Pack, to Delivery, are a Vital Part of a Successful Home-Shopping Program', Supermarket News, Oct. 6, 1997, 2 pages.
QuickRef Guide, QuickRefUS, Version 4.0x, U.S. Retail, 1998, 34 pgs.
Saccomano, Ann, "Blue Laws' Still Apply," Traffic World, Logistics Section, p. 15, Aug. 23, 1999, 2 pages.
Sekita, Takashi, 'The Physical Distribution Information Network in the Home-Delivery Business' Japan Computer Quarterly, Abstract No. XP-00.431194, 1990, pp. 23-32.
Smart Shopping for Busy People, webpage, Peapod, http://web.archive.org/web/19961113145048/peapod.com/ Nov. 11, 1996, 1 page.
Smith et al., 'Management of Multi-Item Retail Inventory Systems with Demand Substitution', Operations Research, vol. 48, No. 1, Jan.-Feb. 2000, pp. 50-64.
Towie, Henry, 'On the Fast Track with Totaltracks: UPS Deploys Mobile Date Service,' Abstract No. XP-000560076, Document Delivery World, vol. 9, No. 3, 1993, pp. 30-31.
U.S. Appl. No. 09/568,572, filed May 10, 2000.
U.S. Appl. No. 09/620,199, filed Jul. 20, 2000.
U.S. Appl. No. 09/568,570, filed May 10, 2000.
U.S. Appl. No. 09/568,571, filed May 10, 2000.
U.S. Appl. No. 09/568,603, filed May 10, 2000.
U.S. Appl. No. 09/568,613, filed May 10, 2000.
U.S. Appl. No. 09/568,614, filed May 10, 2000.
U.S. Appl. No. 09/568,823, filed May 10, 2000.
User Manual, Peapod, Inc., Version 3.10, Aug. 7, 1992, 83 pages.
Van den Berg, Jeroen, 'A Literature Survey on Planning and Control of Warehousing Systems', Aug. 1999, IIE Transactions vol. 31, No. 8, p. 751.
Vass et al., 'The World Wide Web—Everything you (n)ever wanted to know about its server', IEEE, Oct./Nov. 1998, pp. 33-37.
WebSphere Application Server 3.0, Advanced Edition, Programming Documentation, pp. 1-205, date unknown.
WebSphere Application Server 3.0, Standard Edition, Programming Documentation, pp. 1-188, Allegedly dated Oct. 1999.
WebSphere V3 Performance Tuning Guide, First Edition {Mar. 2000), International Business Machines Corporation 2000, pp. 1-210.
Wilson, Joe, 'Selecting Warehouse Management Software (WMS) for Food Distribution Operations', Frozen Food Digest, Oct. 1998, vol. 14, No. 1, p. 18.
Worth Wren Jr., Fort Worth Star-Telegram Texas, 'Albertson's Expects Online Grocery Shopping to Boom', KRTBN <Knight-Ridder Tribune Business News (Fort Worth Star-Telegram, Texas), Nov. 9, 1998.
Wunnava et al., 'Interactive Multimedia on the World Wide Web', IEEE, Aug. 1999, pp. 110-115.
www.peapod.com, including Introduction to Peapod; How Peapod Works; Peapod: Choosing a Delivery Time; Peapod: Sending Your Order; Retrieved from Internet Archive (web.archive.org) on Jul. 23, 2006, Alleged date Nov. 13, 1996, pp. 1-9.
www.peapod.com, Retrieved from Internet Archive (web.archive.org) on Jul. 23, 2006. Date of document is Feb. 28, 1998.
Enterprise JavaBeans TM Programmer's Guide, Inprise Application ServerTM Version 4.0, 1999 Inprise Corporation, pp. 1-165.
Here's How Peapod Works, webpages, Peapod, http://web.archive.Org/web/19961113151243/peapod.com/work.html, Nov. 13, 1996, 2 pages.
Imposing an Objective Viewpoint, Modem Purchasing, vol. 36, las. 3, Mar. 1994, pp. 1-4.

Installation and Shopping Tips for the Mac, Peapod Video, 1993, 1 page.
Introduction to Peapod, webpages, Peapod, http://web.archive.org/web/19961113145506/peapod.com/intro.html, Nov. 13, 1996, 2 pages.
More Information, webpages, Peapod, http://web.archive.org/web/19961113145540/peapod.com/more.html, Nov. 13, 1996, 2 pages.
Online Groceries, A Quicker Shopping Cart? E-Commerce Customers—What, Where and Why They Buy, Standard Media Inc. and Odyssey, LP, Spring 2000, 19 pages.
Peapod Interactive Grocery Shopping and Delivery Service Now Delivers Via the Internet, Press Release, peapod.com, Apr. 22, 1996, pp. 1-2.
Shopping-Virtually Hassle-Free, Computer Weekly, Apr. 10, 1997, 2 pages.
"IBM Provides the Power for Enterprise e-business Solutions by Launching New Phase of Server Software," News Release, Las Vegas, Jul. 20,1999, 2 pgs.
Alba et al., "Interactive home shopping: Consumer, retailer, and manufacturer incentives to participate in electronic marketeplaces", Journal of Marketing, vol. 61, No. 3, Jul. 1, 1997,18 pgs.
Anon, Automatic ID News, '20/20 Results Achieved with Technology Trio', Sep. 1995,p. 19.
Anupindi et al., 'Estimation of Consumer Demand with Stock-Out Based Substitution: An Application to Vending Machine Product', Marketing Science, vol. 17, No. 4, 1998, pp. 406-423.
Backhome Foods Review, est 1998, 30 pgs.
BIG-IP Controller Administrator Guide, version 3.3, 1997-2000 F5 Networks, Inc., pp. 1-401.
BIG-IP FireGuard Controller Administrator Guide, version 3.3, 1997-2000 F5 Networks, Inc., pp. 1-168.
Bloch et al., 'On the Road of Electronic Commerce-a Business Value Framework, Gaining Competitive Advantage and Some Research Issues', Mar. 1996, 20 pages.
Bluestone Software's EJB Technology, A Technical White Paper by TechMetrix Research, Philippe Mougin, TechMetrix 2000, pp. 1-24.
Bluestone XML-Server: First Application Server to Recognize XML As a Data Type, White Paper, 1999 NC.Focus, pp. 1-21.
Booker, et al. 'Up in the air', Computerworld, Oct. 11, 1993; 27, 41; ABI/INFORM Global, p. 54.
Brown Janelle, 'Pod People Peapod, the online grocery service, sounds great—but can it deliver?' Salon Media Group, Inc., Dec. 17, 1998, 3 pages.
Chandler, Susan. 'The grocery cart in your PC,' Business Week, Iss. 3441, 1995, p. 63, 2 pages.
Coffman, Steve. Building earth's largest library: Drive into the future. Mar. 1999. Searcher, 7, 3, 34(1).
Consumer Direct HHT Training Guide, Jun. 1998, 120 pgs.
Consumer Direct Selling Backhome Foods Products—1999: HHT Training Guide, Mar. 29, 1999, 33 pgs.
Corcoran, Cathy, 'The Skeptic's Guide to on-line shopping. Who has time to shop for groceries? So we gave Peapod a test run.' The Patriot Ledger, Quincy, MA, Jul. 7, 1997, 4 pages.
Descartes Licenses Energy V6 Supply Chain Suite to Major Pepsi Bottler . . . News Release, Descartes Systems Group Inc., Waterloo Ontario, Aug. 27, 1998, 2 pages.
Deshpande, Salil. 'Clustering: Transparent Replication, Load Balancing, and Failover,' CustomWare, Jan. 2000, pp. 1-23.
Dilger, Karen Abramic, 'Warehouse Wonders', Manufacturing Systems, vol. 15, No. 2, Feb. 1, 1997, 4 pages.
Dyck, Timothy, 'IBM's WebSphere 3.0 pushes ahead,' PC Week, vol. 16, No. 42, Oct. 18, 1999, 4 pgs.
Dyson et al., 'Electronic Delivery without the Internet (Digital Delivery of Newspapers)', The Seybold Report on Publishing Systems, vol. 25, No. 1, ISBN: 0736-7260, Sep. 1, 1995, 9 pages.
Eckerson, Wayne, 'Grocers put stock in EDI to streamline deliveries; New electronic data interchange systems offer a wealth of benefits for retailers and suppliers,' Network World, Inc., Aug. 7, 1989, 2 pages.
eShopper: Resources for Web Buying. Savetz, Kevin; Gardiner, Peace, Computer Shopper, 19, 5, 280(1), May, 1999.
Fielding et al., 'Hypertext Transfer Protocol—HTTP/1.1, RFC 2616', Network Working Group, Jun. 1999, pp. 1-90.

(56) References Cited

OTHER PUBLICATIONS

First Stop-Main Menu, website tour, Peapod, http://web.archive.org/web/19961113150913/peapod.com/tour1.html, 13 pages.
Frequently Asked Questions, webpages, Peapod, http://web.archive.Org/web/19961113150832/peapod.com/question.html Nov. 13, 1996, 2 pages.
Fynes, Brian, et al., The Impact of Electronic Data Interchange on Competitiveness in Retail Supply Chain, IBAR, vol. 14, No. 2, 1993, pp. 16-28.
Hiroo Kawata, 'Information Technology of Commercial Vehicles in the Japanese Parcel Service Business,' Abstract No. XP-000560489, 1992, pp. 371-382.
Hoffman, Thomas, 'New UPS CIO eyes cyberdelivery,' Computerworld, Nov. 11, 1996. 30, 46; ABI/INFORM Global, p. 4.
Hyten, Todd, 'Stop & Shop mulls online grocery store', Boston Business Journal (Boston, MA, US), vol. 16, No. 6, Mar. 22, 1996, p. 1.

\* cited by examiner

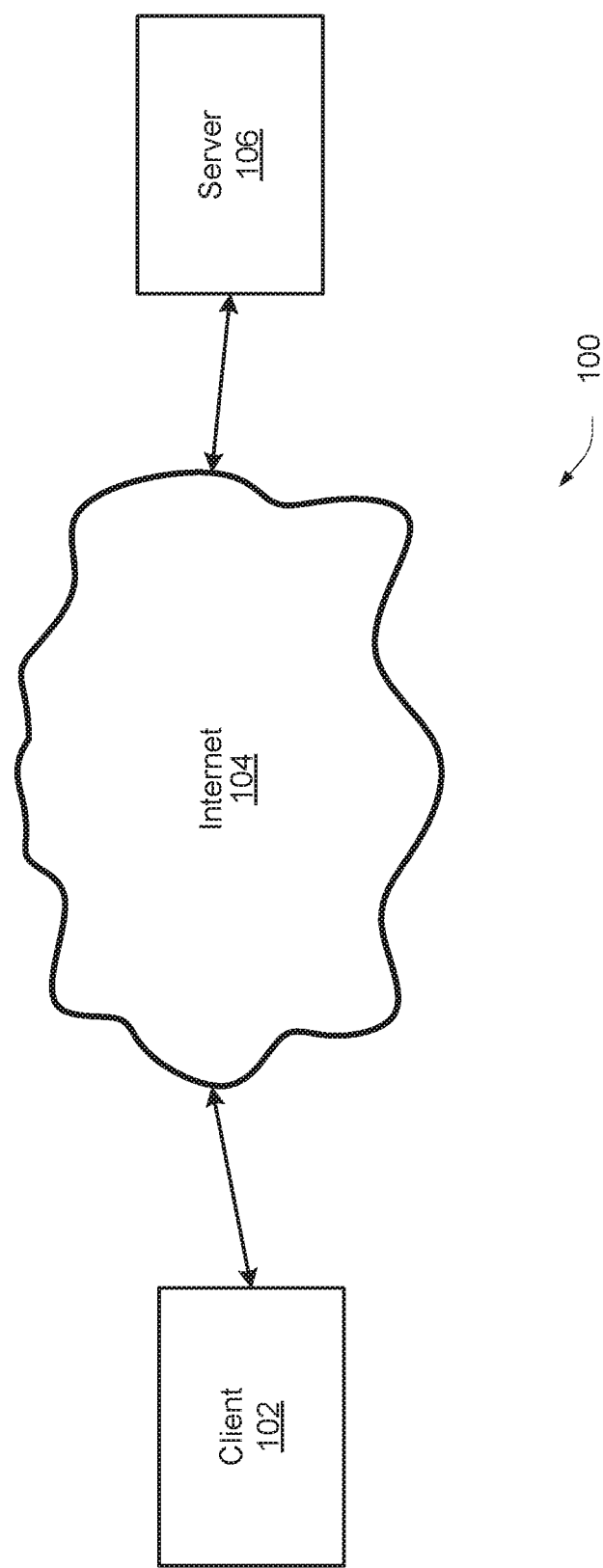
Fig. 1 [Prior Art]

202: Bryan's contact number is (408) 123-4567. If you want to send a fax, please use (650) 123-3232
Click here to send e-mail to Bryan 204: Dean's contact number is (408) 456-7685. If you want to send a fax, please use (650) 123-4568
Click here to send e-mail to Dean 206: Ajit's contact number is (408) 567-8585. If you want to send a fax, please use (650) 123-3232
Click here to send e-mail to Ajit 208: Narasimha's contact number is (408) 567-3421. If you want to send a fax, please use (650) 123-4569
Click here to send e-mail to Narasimha

```
<HTML>
<HEAD>
<META HTTP-EQUIV="Content-Type" CONTENT="text/html; charset=windows-1252">
<META NAME="Generator" CONTENT="Microsoft Word 97">
<TITLE>Figure 2B</TITLE>
<META NAME="Version" CONTENT="8.0.3410">
<META NAME="Date" CONTENT="10/11/96">
<META NAME="Template" CONTENT="C:\Program Files\MSOffice\Office\HTML.DOT">
</HEAD>
<BODY TEXT="#000000" LINK="#0000ff" BGCOLOR="#ffffff">
<TABLE CELLSPACING=0 BORDER=0 WIDTH=672>
<TR><TD VALIGN="MIDDLE">
<P><STRONG>Bryan's contact number is (408) 123-4567. If you want to send a fax, please use (650) 123-3232</STRONG></TD>
</TR>
<TR><TD VALIGN="MIDDLE">
<P>Click here to send e-mail to <A HREF="mailto:Bryan@webvangroup.com">Bryan</A></TD>
</TR>
</TABLE><p>
<TABLE CELLSPACING=0 BORDER=0 WIDTH=672>
<TR><TD VALIGN="MIDDLE">
<P><STRONG>Dean's contact number is (408) 456-7685. If you want to send a fax, please use (650) 123-4563</STRONG></TD>
</TR>
<TR><TD VALIGN="MIDDLE">
<P>Click here to send e-mail to <A HREF="mailto:Dean@webvangroup.com">Dean</A></TD>
</TR>
</TABLE><p>
<TABLE CELLSPACING=0 BORDER=0 WIDTH=672>
<TR><TD VALIGN="MIDDLE">
<P><STRONG>Ajit's contact number is (408) 567-8585. If you want to send a fax, please use (650) 123-3232</STRONG></TD>
</TR>
<TR><TD VALIGN="MIDDLE">
<P>Click here to send e-mail to <A HREF="mailto:Ajit@webvangroup.com">Ajit</A></TD>
</TR>
</TABLE><p>
<TABLE CELLSPACING=0 BORDER=0 WIDTH=672>
<TR><TD VALIGN="MIDDLE">
<P><STRONG>Narasimha's contact number is (408) 567-3421. If you want to send a fax, please use (650) 123-4569</STRONG></TD>
</TR>
<TR><TD VALIGN="MIDDLE">
<P>Click here to send e-mail to <A HREF="mailto:Narasimha@webvangroup.com">Narasimha</A></TD>
</TR>
</TABLE>
<P> </P>
<P> </P></BODY>
</HTML>
```

```
<HTML>
<HEAD>
    <META HTTP-EQUIV="Expires" CONTENT="Tue, 01 Jan 1980 1:00:00 GMT">
    <META HTTP-EQUIV="Pragma" CONTENT="no-cache">
    <TITLE>Figure 2C</TITLE>
    <Script Language="Javascript">
    function G(N, T, F) {
        var t = "<table><tr><td>";
222     t += "<strong>" + N + "</bold>" + "\'s contact number is <strong>" + T + ". If you want to send a fax, please use "
        + F +
        "</td></tr><tr><td>  Click here to send e-mail to <a HREF=\"mailto:" + N + "@webvangroup.com\">"
        + N + "</a></td></tr></Table><br>";
        return t;
    }
    </Script>
</HEAD>
<BODY BGCOLOR="#FFFFFF" vlink=blue link=blue MARGINWIDTH=0 MARGINHEIGHT=0>
224 <Script Language="Javascript">
        S = "";
        S += G("Bryan", "(408) 123-4567", "(650) 123-3232"); S += G("Dean", "(408) 456-7685", "(650) 123-4568");
        S += G("Ajit", "(408) 567-8585", "(650) 123-3232"); S += G("Narasimha", "(408) 567-3421", "(650) 123-4569");
        document.write(S);
    </script>
</BODY>
</HTML>
```

Fig. 2C

DATA TRANSMISSION AND RENDERING TECHNIQUES BY A DEVICE VIA A NETWORK

CROSS REFERENCE TO RELATED APPLICATIONS

This application is a continuation of U.S. patent application Ser. No. 14/083,567, filed Nov. 19, 2013, entitled: "DATA TRANSMISSION AND RENDERING TECHNIQUES BY A DEVICE VIA A NETWORK", and is a continuation of U.S. patent application Ser. No. 12/925,669, filed Oct. 27, 2010, now U.S. Pat. No. 8,601,365, entitled: "Data Transmission and Rendering Techniques Implemented Over a Client-Server System," and is a continuation of U.S. patent application Ser. No. 12/378,643, filed Feb. 17, 2009, now U.S. Pat. No. 7,853,870, entitled: "Data Transmission And Rendering Techniques Implemented Over A Client-Server System," and is a continuation of U.S. patent application Ser. No. 11/821,307, filed Jun. 22, 2007, now U.S. Pat. No. 7,493,554, entitled: "Data Transmission And Rendering Techniques Implemented Over A Client-Server System," and is a continuation of U.S. patent application Ser. No. 09/792,400, filed Feb. 22, 2001, now U.S. Pat. No. 7,240,283, entitled: "Data Transmission and Rendering Techniques Implemented Over A Client-Server System," and claims priority to U.S. Provisional Patent Application No. 60/247,392 filed Nov. 10, 2000, entitled: "Data Compression/decompression Technique," all of which are incorporated herein by reference for all purposes. The present application also relates to U.S. patent application Ser. No. 09/568,603, filed on May 10, 2000, now U.S. Pat. No. 7,177,825, entitled: "Integrated System for Ordering, Fulfillment, and Delivery of Consumer Products using a Data Network," which is incorporated herein by reference in its entirety for all purposes.

BACKGROUND OF THE INVENTION

The present invention relates generally to data networks, and more specifically to data transmission and rendering techniques to be implemented in a client-server system.

FIG. 1 shows a block diagram of a typical client-server system 100, wherein the client device 102 and the server device 106 communicate with each other via the Internet 104.

In most Internet-based client-server systems, when a client process 102 desires specific information from a remote server (such as, for example, a web page), the client process transmits an HTTP request to the server 106 (via Internet 104), and the server responds by transmitting an HTTP response to the client which includes HTML data. A browser on the client machine renders the HTML data and displays it to the user in the form of an HTML (i.e. web) page. This entire process may be initiated by the user at the click of a button, such as, for example, by clicking a mouse button on a URL link. However, the desired information will typically not be displayed instantaneously. Rather, the user typically is required to wait a time interval (referred to as the end-user experienced response time) until the desired information is retrieved from the server system and displayed on the client machine. This delay is undesirable. Accordingly, it will be appreciated that it is generally desirable to reduce the end-user experienced response time.

SUMMARY OF THE INVENTION

According to different embodiments of the present invention, a method and computer program product are disclosed for generating formatted information for display on a computer system. The computer system may be configured to include at least one interface for communicating with a server computer system. A request is sent from the computer system to the server system. According to one embodiment, the request may correspond to an HTTP request for information relating to a specific HTML page or web page. A response is then received from the server system. According to one embodiment, the response includes response information comprising embedded instructions and data. The embedded instructions may include instructions for using the data to generate formatted markup information for display on the computer system. The embedded instructions are then executed on the data to thereby generate formatted markup information for display on the computer system. According to a specific embodiment, the formatted markup information corresponds to HTML data to be rendered for display on the computer system.

Other embodiments are directed to a method and computer program product for generating formatted information for display on a computer system. The computer system may be configured to include at least one interface for communicating with a server computer system. A request for desired information is received from the computer system. According to one embodiment, the request may correspond to an HTTP request for information relating to a specific HTML page or web page. A response is then sent to the computer system. According to one embodiment, the response includes response information comprising embedded instructions and data. The embedded instructions may include instructions for using the data to generate formatted markup information for display on the computer system. According to a specific embodiment, the formatted markup information corresponds to HTML data to be rendered for display on the computer system.

An alternate embodiment of the present invention is directed to a system for generating formatted information for display on a computer system. The system comprises at least one CPU, memory, and at least one interface for communicating with a server computer system. The system may be configured to send a request to the server system via the at least one interface. According to one embodiment, the request may correspond to an HTTP request for information relating to a specific HTML page or web page. The system may further be configured to receive a response from the server system, wherein the response includes response information comprising embedded instructions and data. The embedded instructions may include instructions for using the data to generate formatted markup information for display on the computer system. The system may be further configured to execute the embedded instructions on the data to thereby generate formatted markup information for display on the computer system. According to a specific embodiment, the formatted markup information corresponds to HTML data to be rendered for display on the computer system.

Another embodiment of the present invention is directed to a system for generating formatted information for display on a computer system. The system comprises at least one CPU, memory, and at least one interface for communicating with a client computer system. The system may be configured to receive a request for desired information from the client computer. According to one embodiment, the request may correspond to an HTTP request for information relating to a specific HTML page or web page. The system may further be configured or designed to send a response to the client computer, wherein the response includes response information comprising embedded instructions and data. The embedded instructions may include instructions for using the data to generate formatted markup information for display on the client system. According to a specific embodiment, the formatted markup information corresponds to HTML data to be rendered for display on the client system.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1 shows a block diagram of a conventional client-server system 100.

FIG. 2A shows an example of an HTML page which may be used to illustrate the data transmission and rendering techniques of the present invention.

FIG. 2B shows an example of conventional HTML source code which may be provided by a conventional server to a conventional client device in response to an HTTP request.

FIG. 2C illustrates a specific embodiment of the source code which may be provided by a server to a client device in accordance with a specific embodiment of the present invention.

DESCRIPTION OF THE PREFERRED EMBODIMENT

Figure 3:
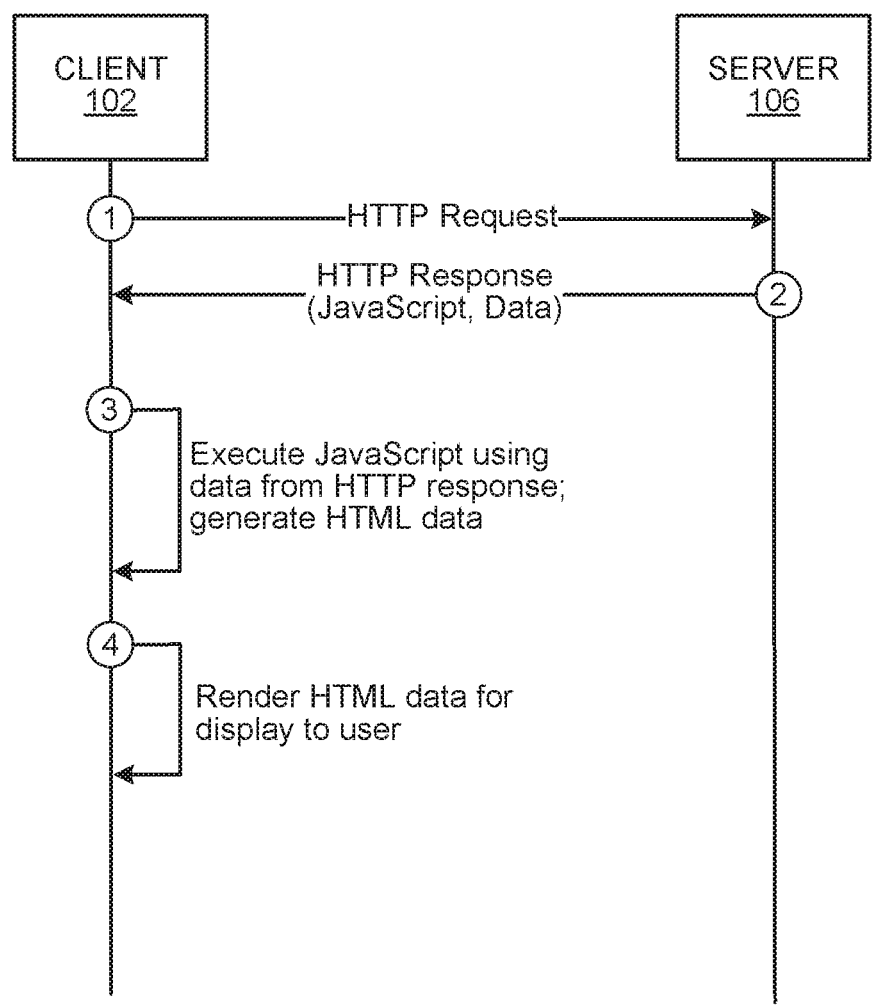
FIG. 3 shows a flow diagram illustrating how information is transmitted between a client system and a server system in accordance with a specific embodiment of the present invention.

This application describes various features associated with data transmission and rendering techniques to be implemented in a client-server system. It will be appreciated, therefore, that the data transmission and rendering techniques described in this application merely define specific embodiments of the data transmission and rendering techniques of the present invention. Alternate embodiments of the data transmission and rendering techniques of the present invention may be derived by modifying various features of the specific embodiment described herein. Such modifications will be apparent to one having ordinary skill in the art.

As described previously in the Background Section of this application, it is generally desirable to reduce the end-user experienced response time as much as possible. In this regard, it will be appreciated that a combination of different factors may contribute to the overall end-user experienced response time, such as, for example, the server response time, communication latency, download time, client processing speed, etc. The server response time indicates how quickly a server is able to respond to a particular request, such as, for example, an HTTP request. The communication latency represents the start up costs associated with the connection between the client and the server. Typically, each time the user clicks on a particular link in a web browser application, a connection to a server is established, which incurs another latency period. The client processing speed corresponds to how quickly the client (or browser machine) is able to render the page as it receives it. The download time represents an amount of time that it takes to download a requested page once the request has been received and processed by the server. This value may be significantly affected by the connection speed that has been established between the client and the server.

With the limited connection speeds that are typically established between the client and the server, one of the more significant factors in the end-user experienced response time is the size of the page being downloaded. Thus, it will be appreciated that, by reducing the amount of bytes to be downloaded from the server process, the end-user experienced response time may also be reduced.

FIG. 2A shows an example of an HTML page which may be used to illustrate the data transmission and rendering techniques of the present invention. The HTML page 200 of FIG. 2A represents the web page which is displayed to a user of the client device 102. In the example of FIG. 2A, it is assumed that the web page 200 represents a phone book page which includes personalized contact information specific to that user. For example, a first entry 202 on page 200 provides personalized information for a contact named Bryan. A second entry 204 on page 200 provides personalized information for a contact named Dean. A third entry 206 on page 200 provides personalized information for a contact named Ajit. A fourth entry 208 on page 200 provides personalized information for a contact named Narasimha.

FIG. 2B shows an example of conventional HTML source code which may be provided by the server 106 to the client device 102, and subsequently used by a conventional web browser (such as, for example, Netscape Navigator or Internet Explorer) on the client device for rendering the web page 200. As illustrated in FIG. 2B, each entry 212, 214, 216 and 218 in the HTML source code corresponds to a respective entry 202, 204, 206, 208 displayed on web page 200. Moreover, it will be appreciated that each character of text which is displayed on the web page 200 is included in the HTML source code of FIG. 2B.

FIG. 2C illustrates a specific embodiment of modified source code which may be provided by the server 106 to the client device 102, and subsequently used for rendering the HTML page 200 in accordance with a specific embodiment of the present invention. As shown in FIG. 2C, the source code includes an embedded instruction portion 222 and an embedded data portion 224. In the example of FIG. 2C, it is assumed that the embedded instruction portion 222 is implemented using a scripting language such as, for example, JavaScript, and that the client web browser is capable of executing the embedded instructions. When compared to the source code of FIG. 2B, it can be seen at the source code of FIG. 2C includes fewer bytes of information. For example, it can be seen that the characters "If you want to send a fax, please use" are repeated four (4) times in FIG. 2B, but are included only once in FIG. 2C. The data portion 224 includes all the customized data which will eventually be rendered into customized HTML data.

It will be appreciated that the actual number of bytes to be transferred from the server 106 to the client device 102 in FIG. 2B is significantly greater than that of FIG. 2C. More specifically, the byte size of the data represented by FIG. 2B is 1,730 bytes, whereas the byte size of the data represented by FIG. 2C is 960 bytes.

Thus, according to at least one embodiment of the present invention, rather than the server 106 sending the entire HTML source code (as shown in FIG. 2B) to the client machine 102, the server may transmit embedded instructions and data (as shown in FIG. 2C) to the client machine, wherein the embedded instructions and data are processed at the client machine to thereby generate HTML data to be rendered for displaying to a user.

FIG. 3 shows a flow diagram illustrating how information is transmitted between a client system 102 and a server system 106 in accordance with a specific embodiment of the present invention. It will be appreciated that the flow diagram of FIG. 3 merely represents an example of a specific embodiment of how the technique of the present invention may be used to reduce the amount of actual bytes transferred from a server device to a client device.

Referring to FIG. 3, it is initially assumed that the client transmits (1) an HTTP request to the server 106. For purposes of illustration, it is assumed that the HTTP request corresponds to a request to retrieve web page 200 of FIG. 2A. The server responds (2) by transmitting an HTTP response to the client machine. According to a specific embodiment, the HTTP response includes embedded instructions and data such as that shown, for example in FIG. 2C. According to a specific implementation, the embedded data may be in ASCII text format. The embedded data may also be in other forms, such as, for example, Unicode. Additionally, according to specific embodiments, the embedded instructions may correspond to scripting language which can be interpreted by a browser or other rendering program, or alternatively, may correspond to executable code, such as, for example, a plug-in, which may be executed on at the client system 102. In the example of FIG. 3, it is assumed that the embedded instructions are implemented using JavaScript.

Upon receiving the HTTP response, the client machine may execute (3) the JavaScript on the data provided in the HTTP response to thereby generate HTML code for rendering on the client machine. According to a specific embodiment, this action may be performed by a browser application that has been configured or designed to interpret scripting instruction language such as, for example, JavaScript or JSCRIPT. Alternatively, the embedded instructions may correspond to executable code which is executed on the client system using the data from the HTTP response to generate the HTML code. A web browser or other rendering program on the client machine may than use the generated HTML code to render (4) the HTML page to be displayed on the client machine's display device.

It will be appreciated that, according to a specific embodiment of the present invention, the response transmitted from the server 106 to the client system 102 may not always include both embedded instructions and embedded data. In one implementation, the particular request transmitted by the client system to the server may be used by the server determine whether the response to the client should include only data, or both data and instructions.

By way of illustration, it is assumed that the server 106 has already transmitted a first response to client 102 which includes embedded instructions 222 and data 224 as shown in FIG. 2C. Further, it is assumed that a browser program has executed the instructions 222 on the data 224 to generate HTML data, which the browser program then rendered for display as shown in FIG. 2A. Additionally, in this example, it is assumed that the rendered page includes two additional links (not illustrated in FIG. 2A). The first link is displayed as "VIEW CALENDAR", and the second link is displayed as "NEXT PAGE". If the user clicks on the NEXT PAGE link, the client system will send a request to the server to retrieve the next page of contact information. When the server receives this request, it may determine from the request that it need only send the data portion relating to the next page of contact information. The client system has previously received the embedded instructions 222 for rendering the next page data. Thus, when the client system subsequently receives a response from the server which includes the next page data portion (but does not include the embedded instructions portion), the client machine may execute the previously received instructions 222 on the newly received data to thereby render the next page of contact information for display to the user.

Alternatively, if the user clicks on the VIEW CALENDAR link, the client system will send a request to the server to retrieve calendar information (which is assumed to be displayed using a different format than that shown in FIG. 2A). When the server receives this request, it may determine from the request that it needs to send both new data (i.e. calendar data) and new instructions (for rendering the calendar data) to the client system. Upon receiving the response from the server, the client system may then execute new instructions on the calendar data to thereby generate HTML data to be rendered for display to the user.

From the above description, it will be appreciated that the data transmission and rendering techniques of the present invention may be used to reduce the amount of actual bytes transferred from a server system (e.g., 106, FIG. 1) to a client system (e.g., 102, FIG. 1) in response to a specific client request. In this way the technique of the present invention may significantly improve the end-user experienced response time by reducing the amount of actual bytes which need to be received at the client machine, for example, during a single request-response transaction. Moreover, it will be appreciated that the technique of the present invention may be utilized in environments where connection speed is a significant factor in the end-user experienced response time.

Generally, the data transmission and rendering techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the data transmission and rendering technique of this invention may be implemented on a general-purpose programmable machine selectively activated or reconfigured by a computer program stored in memory. Such programmable machine may be a computer system or network device such as that shown in FIG. 4 of the drawings. The network device may have multiple network interfaces including, for example, frame relay, Ethernet, ISDN, etc. Specific examples of such a network device include routers and servers. A general architecture for some of these machines will appear from the description given below. In an alternative embodiment, the data transmission and rendering technique of this invention may be implemented on a general-purpose network host machine such as a personal computer or workstation. Further, the invention may be at least partially implemented on a card (e.g., an interface card) for a network device or a general-purpose computing device.

Figure 4:
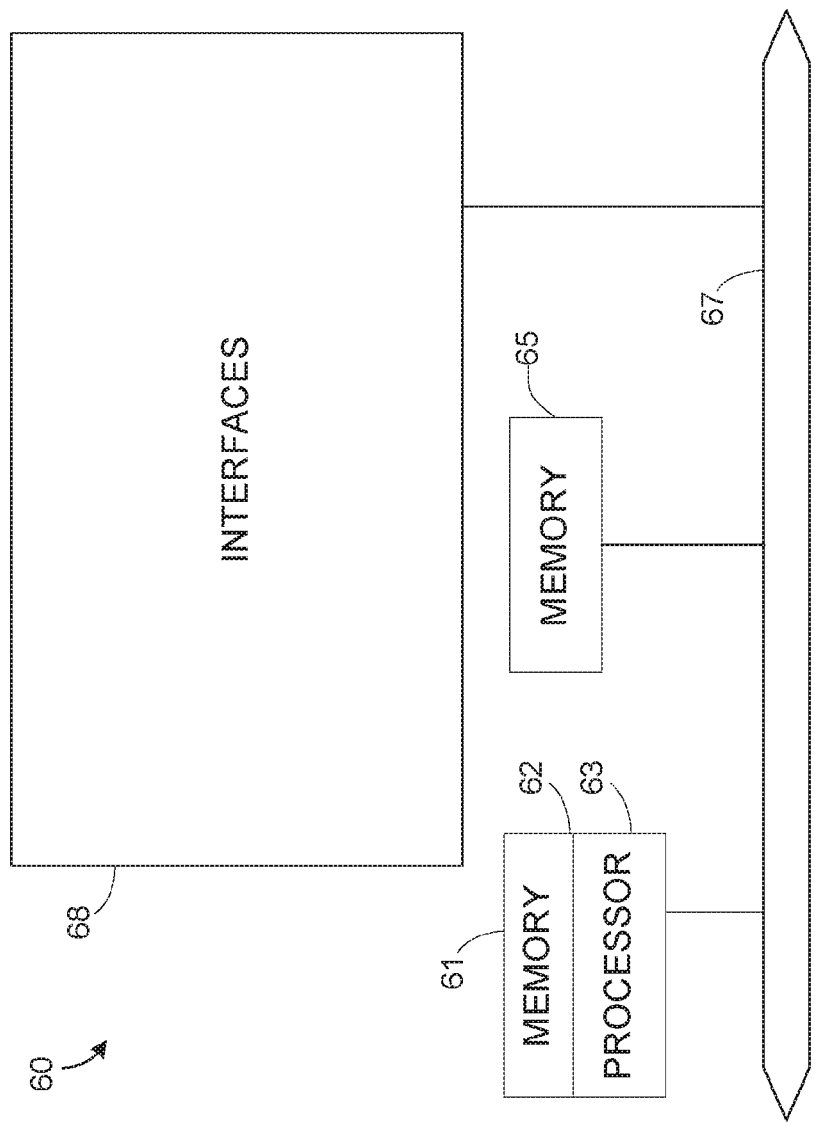
FIG. 4 shows a network device 60 suitable for implementing the data transmission and rendering techniques of the present invention.

Referring now to FIG. 4, a network device 60 suitable for implementing the data transmission and rendering techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a client network device, the CPU 62 may be responsible for such tasks as transmitting and receiving information to and from other network devices, analyzing received information, executing JavaScript, generating HTML data using non-HTML data received from another network device, rendering HTML data for display to a user, etc. The CPU 62 preferably accomplishes all these functions under the control of software including an operating system (e.g., Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 4 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the data transmission and rendering techniques described herein. The program instructions may control the operation of an operating system and/or one or more applications, for example. The memory or memories may also be configured to include data structures which store data received from other network devices, locally generated HTML data, rendered HTML pages, etc.

Because such information and program instructions may be employed to implement the systems/methods described herein, the present invention relates to machine readable media that include program instructions, state information, etc. for performing various operations described herein. Examples of machine-readable media include, but are not limited to, magnetic storage media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in transmission media such as a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as described herein.

The invention claimed is:

1. A method, comprising:
   receiving, at a first device, a first request for a first set of structured information to be displayed at the first device;
   transmitting information associated with the first request to a second device, wherein the information associated with the first request indicates that a first response responsive to the first request includes instructions and a first set of data;
   receiving, from the second device, the first response responsive to the first request, the first response comprising the instructions and the first set of data;
   generating at least a portion of the first set of structured information for display at the first device by executing at least a portion of the instructions from the first response on at least a portion of the first set of data from the first response, wherein a first size of the at least a portion of the instructions from the first response and the at least a portion of the first set of data from the first response together is smaller than a second size of the at least a portion of the first set of structured information being generated for display;
   receiving, at the first device, a second request for a second set of structured information to be displayed at the first device;
   transmitting information associated with the second request to the second device, wherein the information associated with the second request indicates that a second response responsive to the second request includes a second set of data but not the instructions;
   receiving, from the second device, the second response responsive to the second request, the second response comprising the second set of data, the second response excluding the instructions; and
   generating at least a portion of the second set of structured information for display at the first device by executing the at least a portion of the instructions from the first response on at least a portion of the second set of data from the second response.

2. The method as recited in claim 1, further comprising transmitting the information associated with the first request to the second device via a network.

3. The method as recited in claim 1, wherein the first request is received via a user operation at a user interface.

4. The method as recited in claim 1, wherein the at least a portion of the instructions from the first response is provided in a scripting language.

5. The method as recited in claim 4, wherein the scripting language is JavaScript.

6. The method as recited in claim 1, wherein the at least a portion of the instructions from the first response is executed by a program executing at the first device.

7. The method as recited in claim 6, wherein the program is a browser.

8. The method as recited in claim 1, wherein the information associated with the first request is configured to be transmitted in a wireless manner.

9. The method as recited in claim 1, wherein the at least a portion of the first set of structured information is in a markup language.

10. The method as recited in claim 1, wherein the first set of structured information includes information associated with a number of products available to be ordered using the first device.

11. A computer program product, the computer program product being embodied in a non-transitory computer readable storage medium comprising computer instructions for:
receiving, at a first device, a first request for a first set of structured information to be displayed at the first device;
transmitting information associated with the first request to a second device, wherein the information associated with the first request indicates that a first response responsive to the first request includes instructions and a first set of data;
receiving, from the second device, the first response responsive to the first request, the first response comprising the instructions and the first set of data;
generating at least a portion of the first set of structured information for display at the first device by executing at least a portion of the instructions from the first response on at least a portion of the first set of data from the first response, wherein a first size of the at least a portion of the instructions from the first response and the at least a portion of the first set of data from the first response together is smaller than a second size of the at least a portion of the first set of structured information being generated for display;
receiving, at the first device, a second request for a second set of structured information to be displayed at the first device;
transmitting information associated with the second request to the second device, wherein the information associated with the second request indicates that a second response responsive to the second request includes a second set of data but not the instructions;
receiving, from the second device, the second response responsive to the second request, the second response comprising the second set of data, the second response excluding the instructions; and
generating at least a portion of the second set of structured information for display at the first device by executing the at least a portion of the instructions from the first response on at least a portion of the second set of data from the second response.

12. The computer program product as recited in claim 11, wherein the first request is received via a user operation at a user interface.

13. The computer program product as recited in claim 11, wherein the at least a portion of the instructions from the first response is provided in a scripting language.

14. The computer program product as recited in claim 13, wherein the scripting language is JavaScript.

15. The computer program product as recited in claim 11, wherein the at least a portion of the instructions from the first response is executed by a program executing at the first device.

16. The computer program product as recited in claim 15, wherein the program is a browser.

17. The computer program product as recited in claim 11, wherein the information associated with the first request is configured to be transmitted in a wireless manner.

18. The computer program product as recited in claim 11, wherein the at least a portion of the first set of structured information is in a markup language.

19. The computer program product as recited in claim 11, wherein the first set of structured information includes information associated with a number of products available to be ordered using the first device.

20. A first device, comprising:
one or more processors configured to:
receive a first request for a first set of structured information to be displayed at the first device;
transmit information associated with the first request to a second device, wherein the information associated with the first request indicates that a first response responsive to the first request includes instructions and a first set of data;
receive, from the second device, the first response responsive to the first request, the first response comprising the instructions and the first set of data;
generate at least a portion of the first set of structured information for display at the first device by executing at least a portion of the instructions from the first response on at least a portion of the first set of data from the first response, wherein a first size of the at least a portion of the instructions from the first response and the at least a portion of the first set of data from the first response together is smaller than a second size of the at least a portion of the first set of structured information being generated for display;
receive a second request for a second set of structured information to be displayed at the first device;
transmit information associated with the second request to the second device, wherein the information associated with the second request indicates that a second response responsive to the second request includes a second set of data but not the instructions;
receive, from the second device, the second response responsive to the second request, the second response comprising the second set of data, the second response excluding the instructions; and
generate at least a portion of the second set of structured information for display at the first device by executing the at least a portion of the instructions from the first response on at least a portion of the second set of data from the second response; and
one or more memories coupled to the one or more processors and configured to provide the one or more processors with instructions.

* * * * *